May 5, 1936.  E. R. DYE  2,039,398

PRESTRESSED BEAM AND METHOD OF MANUFACTURE

Filed Oct. 11, 1934   2 Sheets-Sheet 1

Inventor
Edward R. Dye.
By A. F. Randolph Jr.
Attorney

May 5, 1936.  E. R. DYE  2,039,398
PRESTRESSED BEAM AND METHOD OF MANUFACTURE
Filed Oct. 11, 1934  2 Sheets-Sheet 2
Fig. 5.
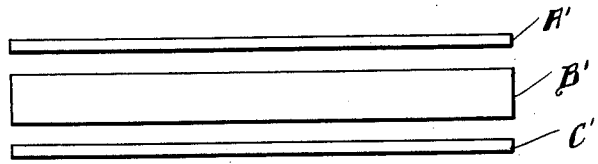
Fig. 6.   Fig. 6a.
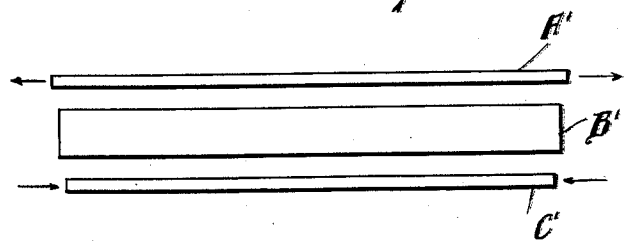 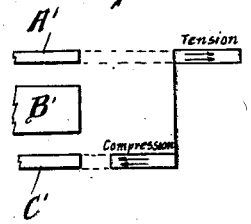
Fig. 7.   Fig. 7a.
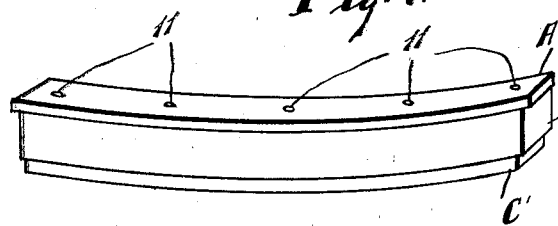 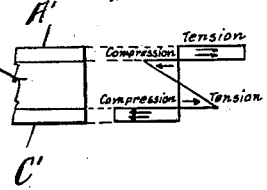
Fig. 8.   Fig. 8a.
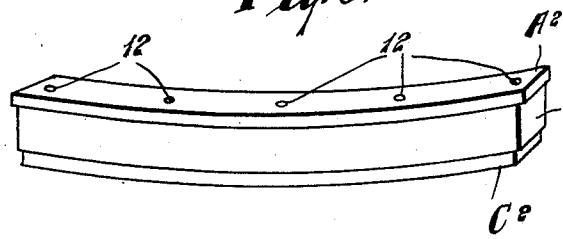 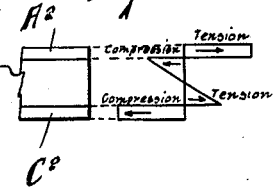
Inventor
Edward R. Dye
By L. F. Randolph, Jr.
Attorney Patented May 5, 1936

2,039,398

UNITED STATES PATENT OFFICE 2,039,398

PRESTRESSED BEAM AND METHOD OF MANUFACTURE

Edward R. Dye, Bozeman, Mont.

Application October 11, 1934, Serial No. 747,969

7 Claims. (Cl. 189—37)

This invention relates to a beam or structural element.

The main object of the invention is to provide a beam or structural element which is tensioned in the uppermost fibres thereof and compressed in the lowermost fibres thereof so as to greatly strengthen the beam.

Further objects of the invention are to provide means and method whereby a beam or structural element regardless of the material used therein, that is, wood, metal, or the like may be prestressed and pretensioned to attain the previously mentioned characteristics in a beam as manufactured, that is, prior to installation or use.

The more specific objects and advantages will become apparent from a consideration of the description following taken in connection with accompanying drawings illustrating an operative embodiment.

In said drawings:

Figure 5 is an elevation of the initial bars of a modified form of beam;

Figure 6 is a view showing the bars of Figure 5 in condition for attachment, with Figure 6—A being a stress diagram thereof;

Figure 7 is a view of the complete modified beam with Figure 7—A being a stress diagram thereof;

Figure 8 is a view in perspective of a further modified form of beam provided by temperature control; and Figure 8—A is a stress diagram of the beam of Figure 8.

Figure 1:
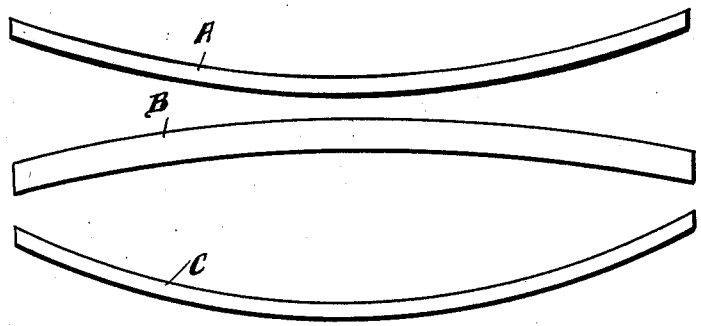
Figure 1 is a view in side elevation showing the necessary bars used in the manufacture of the composite beam, such bars being disassembled.
Figure 2:
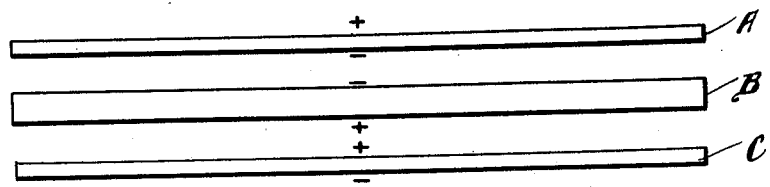
Figure 2 is an elevation of the same bars held in straight line position.
Figure 3:
Figure 3 is a side elevation of the complete beam according to the invention.

Referring specifically to the drawings, and first to Figures 1 to 4, a final product or composite beam is shown in Figure 3. It consists of initially separate bars A, B, and C. Initially such bars A, B, and C are of the shape shown in Figure 1, each being arcuate and without stress as shown in Figure 1, the intermediate bar B being reversely arcuate to the other bars. Such bars A, B, and C may be of wood or metal or any other desired material. In the case where they are of wood, they may be bent with the aid of steam into the form of Figure 1.

In any suitable manner, the bars A, B, and C are stressed and held in the straight line position of Figure 2, and are fastened together in any suitable manner as by means of fastenings at 10. These fastenings may be nails, or screws. If the bars are of wood, they may be fastened together solely by the use of glue or glue may be used in addition to the fastenings 10.

Figure 4:
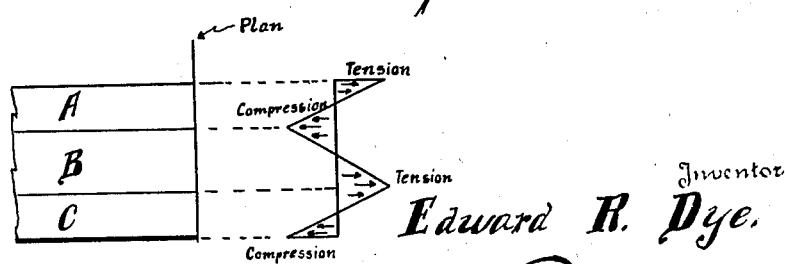
Figure 4 is an engineer's stress diagram of the beam.

The completed beam of Figure 3 will support a greater load than a solid beam of the same section and span because of the prestress imparted to such beam, because as is apparent from the engineer's diagram of Figure 4, the uppermost fibres of bar A are under tension, while the lowermost fibres of bar A and uppermost fibres of bar B are under compression, the lowermost fibres of bar B and uppermost fibres of bar C are under tension, and the lowermost fibres of bar C are under compression.

Figures 5 to 7—A show a modification of the invention wherein the same results as in the preceding form are attained by a direct stress method. Initially bars A', B', and C' are of the same temperature and there is no stress of any fibres. The bar A', as shown in Figure 6, is placed under tension, bar B' is under no stress, and bar C' is under compression as shown by the stress diagram of Figure 6—A. In this condition, the bars A', B', and C', are fastened together as at 11. The fastenings may consist of bolts, screws, nails, rivets or the like. They may also be glued, welded or clamped as preferred, and according to the material. The beam of Figure 7 will thus be prestressed like the beam of Figure 3, the stress diagram being shown in Figure 7—A.

In Figure 8 another modification is shown using bars $A^2$, $B^2$, and $C^2$. Such bars in this instance are of metal since temperature plays an important part. Initially, the bars $A^2$, $B^2$, and $C^2$ are straight, of the same temperature and there is no stress in any of the fibres. Thereupon, bar $A^2$ is heated, bar $B^2$ is maintained at its initial or atmospheric temperature, and bar $C^2$ is cooled or reduced below its initial or atmospheric temperature. At the last mentioned acquired temperatures, the bars are fastened together in any suitable manner as at 12 and then permitted to return to atmospheric or initial temperature, the final beam being in the shape shown in Figure 8 and possessing the same characteristics and advantages as the beams of Figures 3 and 7, as shown by the stress diagram of Figure 8—A.

Various changes may be resorted to provided they fall within the spirit and scope of the invention.

I claim as my invention:—

1. A structural element in its uninstalled, no-load condition having the uppermost fibres tensioned and the lowermost fibres compressed.

2. A straight beam in its uninstalled, no-load condition having the uppermost fibres tensioned and the lowermost fibres compressed.

3. A structural element in its uninstalled, no-load condition comprising more than two bars, the uppermost bar having its uppermost fibres under tension and the lowermost bar having its lowermost fibres under compression.

4. The method of producing prestressed beams consisting in fastening together with the adjacent walls in intimate contact, bars initially arched in the same direction, and a bar therebetween initially arched reversely to the first mentioned bars.

5. The method of producing a structural element prestressed in its uninstalled condition consisting in securing to an intermediate bar means under no-load and on opposite sides thereof, a bar of greater temperature than the intermediate bar means, and a bar of lower temperature than the intermediate bar means.

6. The method of making a beam prestressed in its uninstalled condition consisting in arranging on opposite sides of and securing to an unstressed bar, a tensioned bar, and a compressed bar.

7. A structural element, comprising three bars, the fibres of the upper half of the top bar being under tension, and the remaining fibres of the top bar being under compression, the fibres of the upper half of the intermediate bar being under compression, and the remaining fibres of the intermediate bar being under tension, the fibres of the upper half of the lower bar being under tension and the remaining fibres of the lower bar being under compression.

EDWARD R. DYE.